US010085229B2

(12) United States Patent
Yu

(10) Patent No.: US 10,085,229 B2
(45) Date of Patent: Sep. 25, 2018

(54) METHOD AND SYSTEM FOR TRIGGERING MTC DEVICE

(75) Inventor: Wantao Yu, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 14/127,223

(22) PCT Filed: Sep. 14, 2011

(86) PCT No.: PCT/CN2011/079638
§ 371 (c)(1),
(2), (4) Date: Dec. 18, 2013

(87) PCT Pub. No.: WO2012/151819
PCT Pub. Date: Nov. 15, 2012

(65) Prior Publication Data
US 2014/0134995 A1     May 15, 2014

(30) Foreign Application Priority Data

Jul. 4, 2011   (CN) .......................... 2011 1 0185533

(51) Int. Cl.
*H04M 3/00*      (2006.01)
*H04W 60/04*     (2009.01)
(Continued)

(52) U.S. Cl.
CPC ........... *H04W 60/04* (2013.01); *H04W 4/005* (2013.01); *H04W 4/70* (2018.02); *H04W 12/04* (2013.01); *H04W 12/08* (2013.01)

(58) Field of Classification Search
CPC ..... H04W 12/12; H04W 12/06; H04W 8/245; H04W 4/14; H04W 4/12; H04M 1/72533
(Continued)

(56) References Cited

U.S. PATENT DOCUMENTS

| 8,122,240 B2 | 2/2012 | Blom et al. |
| 2007/0086590 A1 | 4/2007 | Blom |

(Continued)

FOREIGN PATENT DOCUMENTS

| CN | 102014103 A | 4/2011 |
| CN | 102045810 A | 5/2011 |

(Continued)

OTHER PUBLICATIONS

English Translation of the Written Opinion of the International Search Authority in international application No. PCT/CN2011/079638, dated Apr. 5, 2012. (5 pages—see entire document).

(Continued)

*Primary Examiner* — Anthony Addy
*Assistant Examiner* — Matthew Genack
(74) *Attorney, Agent, or Firm* — Oppedahl Patent Law Firm LLC

(57) ABSTRACT

The present disclosure discloses a method and system for triggering a Machine Type Communication MTC device. The method includes that: an MTC server sends a Bootstrapping Server Function entity BSF a request message including information on a GBA-PUSH Information GPI request and information on a triggering request; the BSF generates GPI and adds parametric information of a triggering instruction in the GPI according to the information on the triggering request through a GPI request processing flow, and sends the GPI including the parametric information of the triggering instruction to the MTC server; the MTC server sends the GPI including the parametric information of the triggering instruction to an MTC device to be triggered; and the MTC device is triggered according to the parametric information of the triggering instruction in the received GPI. With the present disclosure, secure triggering of an MTC device is implemented, and it is ensured that a secure (Continued)

connection can be established between the MTC device and an MTC server.

9 Claims, 3 Drawing Sheets

(51) Int. Cl.
*H04W 4/70* (2018.01)
*H04W 12/08* (2009.01)
*H04W 4/00* (2018.01)
*H04W 12/04* (2009.01)

(58) Field of Classification Search
USPC .................. 455/410, 411, 419, 420, 466
See application file for complete search history.

(56) References Cited

U.S. PATENT DOCUMENTS

| | | |
|---|---|---|
| 2007/0086591 A1 | 4/2007 | Blom et al. |
| 2011/0265158 A1 | 10/2011 | Cha et al. |
| 2011/0296181 A1 | 12/2011 | Barriga et al. |
| 2011/0320802 A1* | 12/2011 | Wang et al. ................. 713/2 |
| 2012/0252518 A1* | 10/2012 | Karampatsis ......... H04W 4/005 455/515 |
| 2014/0056222 A1* | 2/2014 | Zhu et al. ................. 370/328 |

FOREIGN PATENT DOCUMENTS

| | | |
|---|---|---|
| CN | 102047629 A | 5/2011 |
| WO | 2007042345 A1 | 4/2007 |
| WO | 2010090569 A1 | 8/2010 |

OTHER PUBLICATIONS

International Search Report in international application No. PCT/CN2011/079638, dated Apr. 5, 2012. (2 pages—see entire document).
S3-100301, "Reply LS on Machine Type Communications Feature Secure Connection", 3GPP TSG-SA3, SA3#58, Feb. 5, 2010. (1 page—see International Search Report in international application No. PCT/CN2011/079638 for relevant passages).
3GPP TR 33.868 Security aspects of Machine-Type Communications Apr. 15, 2011.
SIMTC-pCR about solution of MTC device triggering Jul. 4, 2011.
3GPP TS 33.223 Generic Authentication Architecture (GAA) Generic Bootstrapping Architecture (GBA) Push function Apr. 4, 2011.
Supplemental European Search Report; PCT/CN2011079638; Feb. 19, 2015.
Living Document on "Security Aspects of Network Improvements for Machine-Type Communication", SA3 , <<S3GPP TSG-SA3#60, S3-100906 >>, Jul. 2, 2010.
LS on Security aspects on external interface to MTC server, SA3, <<SA WG2 Meeting #S2-85, S2-112241>>, May 20, 2011.

* cited by examiner

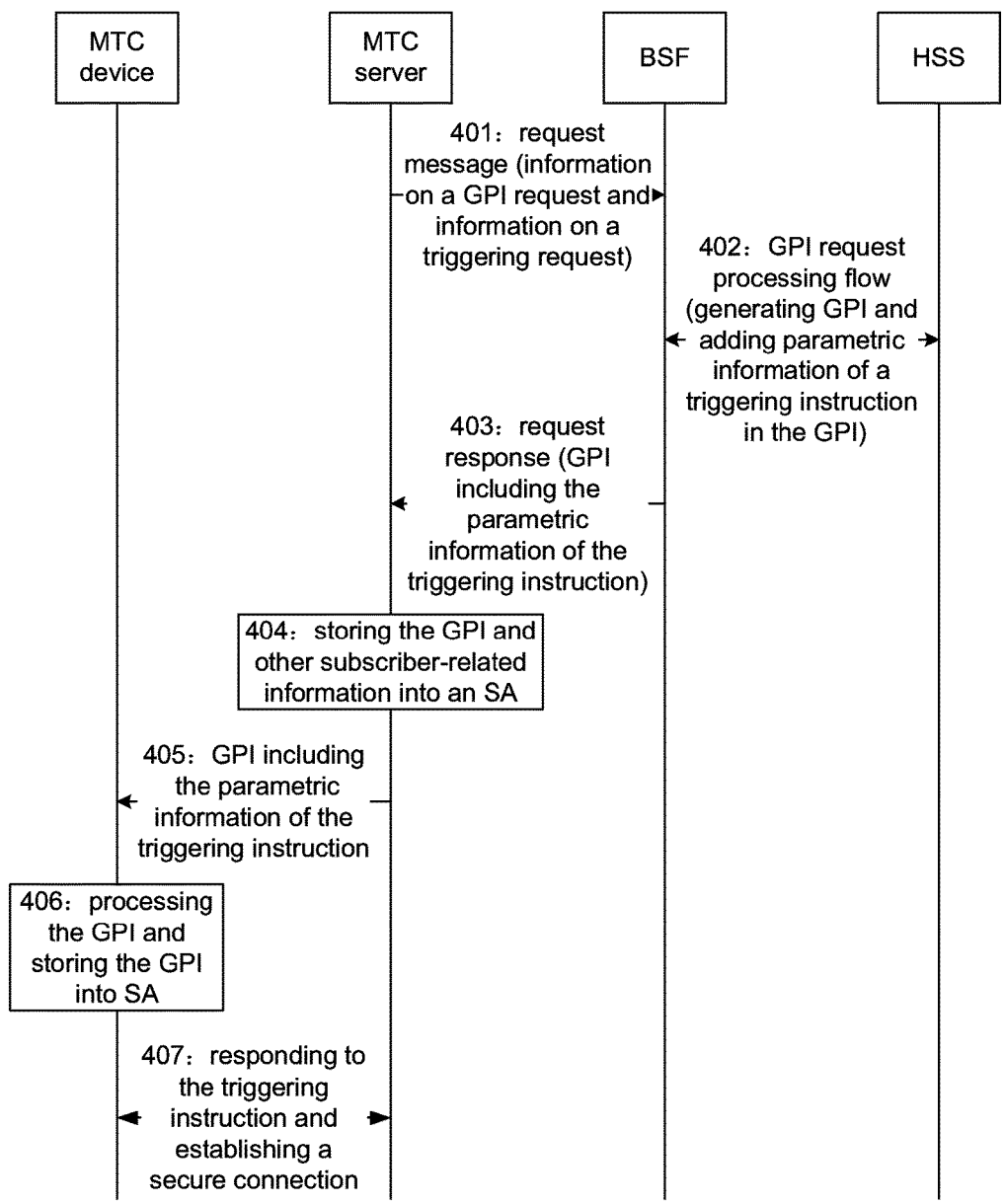

METHOD AND SYSTEM FOR TRIGGERING MTC DEVICE

TECHNICAL FIELD

The present disclosure relates to techniques for mobile communication and Machine Type Communication (MTC), and in particular to a method and system for triggering an MTC device.

BACKGROUND

MTC is a blanket term for a series of techniques for data communication and interaction between two machines, and between a machine and a human being through wireless communication techniques and combination of such techniques. There are two meanings associated with Machine to Machine (M2M): the first meaning is a machine, referred to as an intelligent device in the embedded field; the second meaning is a connection between two machines through a network. The MTC is applied extensively in fields such as intelligent measurement, remote monitoring, tracking, medical treatment, etc., facilitating a more intelligentized life style. Compared with traditional communication between two human beings, MTC devices (M2M devices) are enormous in number and apply extensively, with tremendous market prospect.

In MTC communication, long-distance connection techniques mainly include a Global System for Mobile Communications (GSM), a General Packet Radio Service (GPRS), a Universal Mobile Telecommunications System (UMTS) and the like; and short-distance connection techniques mainly include 802.11b/g, Bluetooth, Zigbee, Radio Frequency Identification (RFID) and the like. As the MTC integrates wireless communication and information technology and may be used for bi-directional communication such as remote information collection, parameter setting, and instruction sending, different application solutions, such as safety monitoring, automatic vending, cargo tracking, and the like, may be implemented with the MTC. Almost all devices involved in daily life are likely to become potential service objects. The MTC provides a simple means for establishing a wireless connection among systems, remote devices or with an individual for real-time device data.

GBA refers to a Generic Bootstrapping Architecture, which defines a general mechanism for Key Agreement between a terminal and a server. FIG. 1 illustrates a network model of the GBA, which mainly includes the following network elements:

a User Equipment (UE), which is a blanket term for a terminal (e.g., a mobile phone) and a Universal Subscriber Identity Module (USIM) card/Subscriber Identity Module (SIM) card, wherein the terminal may be a mobile terminal (e.g., a mobile phone, etc.) with a card slot, or a fixed terminal (e.g., a set-top box, etc.) with a card slot;

a Network Application Function (NAF), which is an application server for implementing a business logic function of an application, and providing business service for the terminal after completing authentication of the terminal;

a BSF, i.e., a Bootstrapping Server Function entity, which is a core network element of the GBA; the BSF and the UE implement the authentication through an Authentication and Key Agreement (AKA) protocol, and agree on an application key to be used subsequently for communication between the UE and the NAF; and the BSF can set a life time for the key according to a local strategy;

a Home Subscriber System (HSS), i.e., a home subscriber server, which is used to store authentication data in the USIM/SIM card such as Ki in the SIM card; and a Subscription Locator Function (SLF), which is a subscription locator function entity, wherein the BSF inquires the SLF for the name of an HSS storing related subscriber data. The SLF is not required in a single-HSS scenario. Nor is the SLF required when the BSF is configured to use a pre-assigned HSS.

A GBA-PUSH, with an architecture as shown in FIG. 2, is a bootstrapping mechanism established on the basis of the GBA, and the GBA-PUSH enables the UE to establish a secure connection with the NAF through a bootstrapping process without being connected to the BSF.

In an MTC system, an MTC server is equivalent to the NAF in the GBA and the GBA-PUSH architecture, and an MTC device is equivalent to the UE in the GBA and the GBA-PUSH architecture. A secure connection between the MTC device and the MTC server may be established through the GBA and the GBA-PUSH architecture.

For many M2M applications, as an MTC subscriber needs to control communication with the MTC device, the MTC device is not allowed to access an MTC server casually. When the MTC server needs to communicate with the MTC device, through a triggering instruction, the MTC server triggers the MTC device to establish a Packet Date Protocol (PDP)/Packet Date Network (PDN) connection. When the MTC device is not connected to an MTC server, an attacker may pretend to be a mobile communication network or an MTC server and send the MTC device a triggering instruction to trigger the MTC device to establish a connection with an MTC server. Therefore, it is required to take a security measure to ensure that the MTC device responds to a triggering instruction that comes from a legitimate mobile communication network or a legitimate MTC server. Currently, in the case that an MTC device is not connected to an MTC server, there is an urgent need for a solution for safe triggering of the MTC device and further establishment of a secure connection between the MTC device and the MTC server.

SUMMARY

In view of this, it is desirable for the disclosure to provide a method and system for triggering an MTC device, so as to implement safe triggering of an MTC device in the case that the MTC device is not connected to an MTC server.

To this end, a technical solution of the present disclosure is implemented as follows.

The present disclosure provides a method for triggering a Machine Type Communication MTC device, including that:

a Machine Type Communication MTC server sends a Bootstrapping Server Function entity BSF a request message including information on a GBA-PUSH Information GPI request and information on a triggering request;

the BSF generates GPI and adds parametric information of a triggering instruction in the GPI according to the information on the triggering request through a GPI request processing flow, and sends the GPI including the parametric information of the triggering instruction to the MTC server;

the MTC server sends the GPI including the parametric information of the triggering instruction to an MTC device to be triggered; and the MTC device is triggered according to the parametric information of the triggering instruction in the received GPI.

The method may further include that: after sending, by the BSF, the GPI including the parametric information of the triggering instruction to the MTC server, the MTC server stores subscriber-related information of the MTC device to be triggered and the GPI except the parametric information of the triggering instruction into a Security Association SA.

The method may further include that: after sending, by the MTC server, the GPI including the parametric information of the triggering instruction to the MTC device to be triggered, the MTC device stores the GPI and subscriber-related information of the MTC device into an SA.

The method may further include that: after the MTC device is triggered, the MTC device returns a triggering response to the MTC server, and establishes a secure connection with the MTC server.

The method may further include that: before the MTC server sends the BSF the request message, the MTC device is registered on the MTC server, which stores related information of the MTC device.

The parametric information of the triggering instruction may include a Trigger Indication.

The parametric information of the triggering instruction may further include a Trigger Time during which the MTC device sends information after being triggered.

The disclosure further provides a system for triggering a Machine Type Communication MTC device, including: a Machine Type Communication MTC server, a Bootstrapping Server Function entity BSF and an MTC device, wherein the MTC server is configured to send the BSF a request message including information on a GBA-PUSH Information GPI request and information on a triggering request;

the BSF is configured to generate GPI and add parametric information of a triggering instruction in the GPI according to the information on the triggering request through a GPI request processing flow, and send the GPI including the parametric information of the triggering instruction to the MTC server;

the MTC server is configured to send the GPI including the parametric information of the triggering instruction to the MTC device to be triggered; and the MTC device is configured to be triggered according to the parametric information of the triggering instruction in the received GPI.

The MTC server may be further configured to, after receiving the GPI, store subscriber-related information of the MTC device to be triggered and the GPI except the parametric information of the triggering instruction into a Security Association SA.

The MTC device may be further configured to, after receiving the GPI, store the GPI and subscriber-related information of the MTC device into an SA.

The MTC device may be further configured to, after being triggered, return a triggering response to the MTC server and establish a secure connection with the MTC server.

The MTC server may be further configured to, before sending the BSF the request message, accept registration of the MTC device and store related information of the MTC device.

The parametric information of the triggering instruction may include a Trigger Indication.

The parametric information of the triggering instruction may further include a Trigger Time during which the MTC device sends information after being triggered.

With the method and system for triggering an MTC device provided by the present disclosure, an MTC server sends a BSF a request message including information on a GPI request and information on a triggering request; the BSF generates GPI and adds parametric information of a triggering instruction in the GPI according to the information on the triggering request through a GPI request processing flow, and sends the GPI including the parametric information of the triggering instruction to the MTC server; the MTC server sends the GPI including the parametric information of the triggering instruction to an MTC device to be triggered; and the MTC device is triggered according to the parametric information of the triggering instruction in the received GPI. With the present disclosure, secure triggering of an MTC device is implemented, and it is ensured that a secure connection can be established between the MTC device and an MTC server.

BRIEF DESCRIPTION OF THE DRAWINGS

FIG. 4 is a flow chart of a method for triggering an MTC device in an embodiment of the present disclosure.

DETAILED DESCRIPTION

A technical solution of the present disclosure will be further elaborated below with reference to the accompanying drawings and specific embodiments.

In an embodiment of the present disclosure, an MTC device refers to a device used for machine-to-machine communication in a mobile communication network, wherein the mobile communication network includes: a Global System for Mobile Communications (GSM) network, a 3rd Generation Partnership Project (3GPP) network, a 3GPP2 network, etc.

Figure 1:
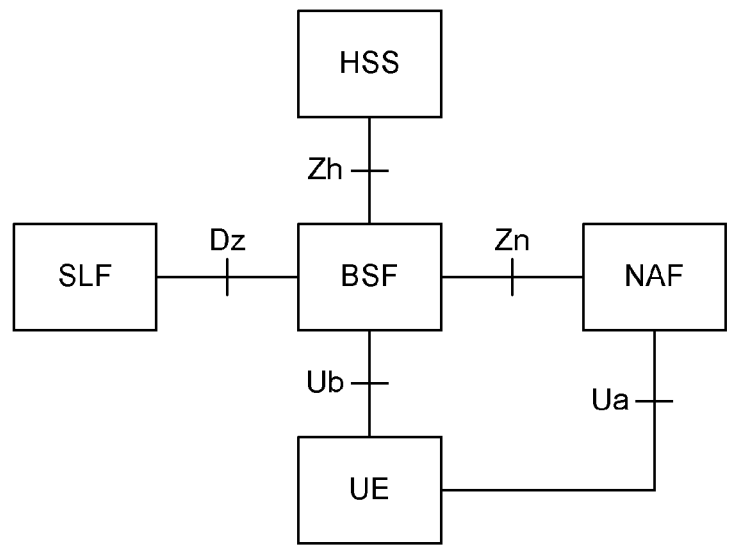
FIG. 1 is a schematic diagram of a network model of a GBA in related art.
Figure 2:
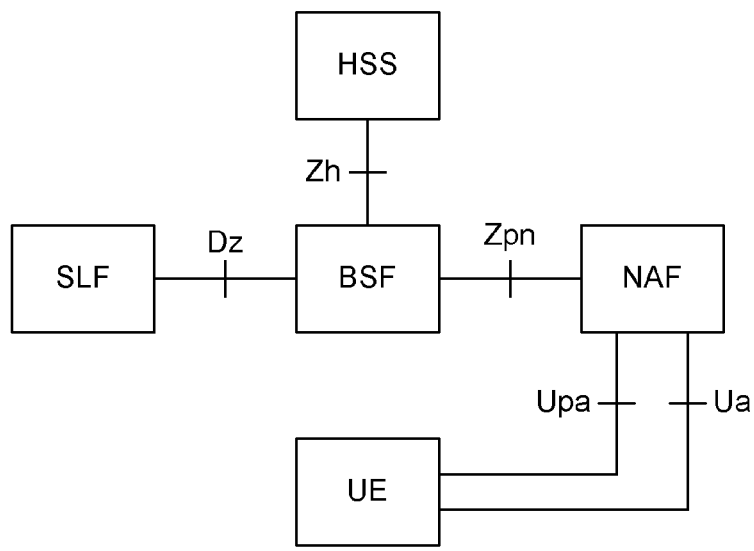
FIG. 2 is a schematic diagram of a network model of a GBA-PUSH architecture in related art.
Figure 3:
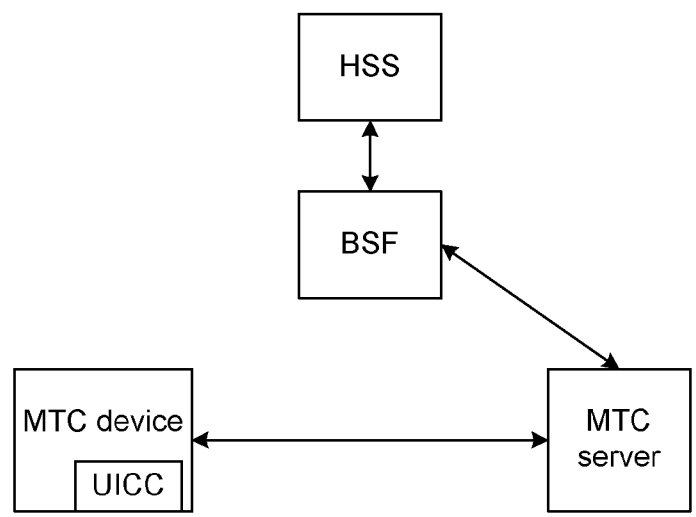
FIG. 3 is a schematic diagram of a structure of a system for triggering an MTC device in an embodiment of the present disclosure.

In an embodiment of the present disclosure, a system for secure triggering of an MTC device, as shown in FIG. 3, includes: an MTC device, a BSF, an HSS, and an MTC server. Wherein, the MTC device is a device used for Machine Type Communication, and a SIM card such as a Universal Integrated Circuit Card (UICC) is installed in the MTC device. The BSF is used to generate, in a GBA-PUSH process, according to a GBA-PUSH request, GBA-PUSH Information (GPI) for triggering establishment of a secure connection, and the BSF can set a life time of a key according to a local strategy. The HSS is used for storing authentication data in the SIM card of the device, such as Ki in the SIM card or the UICC card. The MTC server, which is equivalent to a NAF in a GBA and a GBA-PUSH architecture, may initiate a triggering request and provide M2M business for an MTC subscriber. In an embodiment of the present disclosure, the MTC server may be located inside or outside the mobile communication network.

In an embodiment of the present disclosure, in the case that the MTC device is not connected to an MTC server, when the MTC server needs to communicate with the MTC device, the MTC server may activate the MTC device to establish a secure connection with the MTC server itself through a triggering request or instruction. When the MTC server needs to receive information from the MTC device, the MTC server may trigger the MTC device to establish the secure connection with the MTC server itself by GBA-PUSH. An MTC device to be triggered by GBA-PUSH is required to be registered on the MTC server in advance, and the MTC server stores related information of the registered MTC device; or the MTC server may acquire the related information of the MTC device including identity information, etc. by other means.

During triggering of the MTC device, the MTC server is used to send the BSF a request message including information on a GBA-PUSH Information GPI request and information on a triggering request;

the BSF is used to generate GPI and add parametric information of a triggering instruction in the GPI according to the information on the triggering request through a GPI request processing flow, and send the GPI including the parametric information of the triggering instruction to the MTC server; interaction between the BSF and HSS is required for the GPI request processing flow, wherein the HSS provides subscriber-authentication-related information of the MTC device for the BSF;

the MTC server is also used to send the GPI including the parametric information of the triggering instruction to the MTC device to be triggered; and the MTC device is used to be triggered according to the parametric information of the triggering instruction in the received GPI.

The MTC server further stores subscriber-related information of the MTC device to be triggered and the GPI except the parametric information of the triggering instruction into a Security Association SA after receiving the GPI.

Further, the MTC device stores the GPI and subscriber-related information of the MTC device into the SA after receiving the GPI.

The MTC device returns a triggering response to the MTC server and establishes a secure connection with the MTC server after being triggered.

Shown in FIG. 4 is a flow chart of a method for triggering an MTC device implemented by the system shown in FIG. 3, the method mainly including that:

Step 401, an MTC server sends a request message including information on a GPI request and information on a triggering request to a BSF;

Step 402, after receiving the request message, the BSF generates GPI and adds parametric information of a triggering instruction in the GPI according to the information on the triggering request through a GPI request processing flow. The parametric information of the triggering instruction may include a Trigger Indication, and preferably, may further include a Trigger Time during which the MTC device sends information after being triggered.

A format of the GPI after addition of the parametric information of the triggering instruction is as shown in Table 1.

TABLE 1

| Parameter name | Description | Notes |
| --- | --- | --- |
| Ver | Version of GPI | The version number is introduced to allow changes of GPI format and protection algorithms. |
| RAND | RAND in UMTS AKA | Defined in TS 33.102 [6] |
| AUTN(*) | AUTN or AUTN* | Defined in TS 33.220 [1] |
| App_Lbl | Identifier for UICC application to use | This variable may be left empty if the UICC application to use is evident from context or agreement. The Application Label is defined in TS 31.101 [15] |
| U/M | Indicator for use of GBA_ME or GBA_U | |
| NAF_Id | Concatenation of NAF FQDN and Ua security protocol Id | Defined in TS 33.220 [1]; Confidentiality protected |
| Key_LT | Requested NAF-Key life time | Confidentiality protected |
| P-TID | NAF SA Identifier | To be used by UE when responding to NAF. The identifier is included only to enable that it is confidentiality protected in the GPI. See also clause 5.2.2. Confidentiality protected |
| MAC | Message authentication code over GPI | The integrity protection covers the complete GPI |
| Trigger Indication | Instruction for triggering an MTC device | the triggering instruction may or may not be safeguarded, depending on a system or a specific implementation |
| Trigger Time | duration in which the MTC device sends information after being triggered | the Trigger Time may or may not be safeguarded, depending on a system or a specific implementation |
| . . . | | |

Step 403, the BSF sends the GPI including the parametric information of the triggering instruction to the MTC server through a request response.

Step 404, the MTC server stores the received GIP information and other subscriber-related information into a Security Association SA. Wherein, the parametric information of the triggering instruction is not required to be stored on the MTC server.

The SA specifically includes parametric information as shown in Table. 2:

TABLE 2

| Parameter name | NAF | UE | Description | Notes |
|---|---|---|---|---|
| UE_Id | m | o | The user identity used in NAF request. | |
| UE_Priv_Id | o | — | Private user identity (IMSI/IMPI) for used UE_Id | |
| UE_Trp | m | — | Transport address to which GPI should be delivered | The transport address used by the NAF when pushing GPI to the UE |
| RAND | m | m | RAND in UMTS AKA | From GPI |
| AUTN(*) | m | m | AUTN or AUTN* | From GPI |
| App_Lbl | m | m | UICC application identifier | From GPI or other implicit agreement or information. |
| NAF_Id | m | m | Concatenation of NAF FQDN and Ua security protocol Id | |
| Enc_GPI | m | — | Encrypted part of GPI plus MAC | |
| Mac_GPI | m | — | BSF generated MAC over GPI | |
| UL_SA_Id | m | m | Uplink NAF SA identity | |
| DL_SA_Id | m | m | Downlink NAF SA identity | |
| Ks_NAF/ Ks_ext_NAF | m | m | External NAF-key | Ks_NAF is generated in GBA_ME based GBA-Push Ks_ext_NAF is generated in GBA_U based GBA_Push |
| Ks_int_NAF | o | o | UICC internal NAF-key | Ks_int_NAF is generated in GBA_U based GBA_Push |
| Key_LT | m | m | Received NAF-Key life time | |

Step 405, the MTC server sends the GPI including the parametric information of the triggering instruction to the MTC device.

Step 406, the MTC device receives the GPI including the parametric information of the triggering instruction, processes all of the GPI except the parametric information of the triggering instruction according to a processing flow defined by GBA-PUSH, and stores an SA corresponding to the GPI.

Step 407, the MTC device is triggered according to the parametric information of the triggering instruction in the GPI, responds to the triggering instruction of the MTC server, and establishes a secure connection with the MTC server according to the SA. The MTC device sends information to the MTC server in a period corresponding to the Trigger Time in the parametric information of the triggering instruction.

In short, in the present disclosure, a GBA-PUSH process is used for triggering an MTC device, i.e., the parametric information of the triggering instruction is added in the GPI of the GBA-PUSH process, and then sent to the MTC device. High security of the GBA-PUSH process ensures that an MTC device is triggered safely, thereby implementing secure triggering of an MTC device, and ensuring that secure connection can be established between the MTC device and an MTC server.

What described above are merely preferred embodiments of the present disclosure, and are not intended to limit the protection scope of the present disclosure.

The invention claimed is:

1. A method for triggering a Machine Type Communication (MTC) device, comprising:
    sending, by a Machine Type Communication (MTC) server, a Bootstrapping Server Function (BSF) entity a request message that comprises information on a Generic Bootstrapping Architecture Push (GBA-PUSH) Information (GPI) request and information on a triggering request of triggering an MTC device, when the MTC device is not connected to the MTC server;
    generating, by the BSF through a GPI request processing flow, GPI, wherein the GPI comprises the following: a version of the GPI, random number (RAND) in Universal Mobile Telecommunications System (UMTS) Authentication and Key Agreement (AKA), Authentication token (AUTN) or AUTN(*), an identifier for Universal Integrated Circuit Card (UICC) application to use, an indicator for use of Mobile Equipment (ME)-based GBA (GBA_ME) or GBA with UICC-based enhancements (GBA_U), a concatenation of Network Application Function (NAF) Fully Qualified Domain Name (FQDN) and a reference point Ua security protocol Identifier (Id), a requested NAF-Key life time, a NAF Security Association (SA) identifier, and a message authentication code over the GPI;
    and adding, by the BSF, parametric information of a triggering instruction of triggering the MTC device in the GPI according to the information on the triggering request; and sending, by the BSF, the GPI that comprises the parametric information of the triggering instruction to the MTC server; wherein the parametric information of the triggering instruction comprises a Trigger Indication;
    sending, by the MTC server, the GPI that comprises the parametric information of the triggering instruction to the MTC device to be triggered;
    storing, by the MTC device, the GPI and subscriber-related information of the MTC device into a SA; and
    triggering the MTC device according to the Trigger Indication in the received GPI;
    the method further comprising: after the triggering the MTC device, returning, by the MTC device, a triggering response to the MTC server, and establishing, by the MTC device, a secure connection with the MTC server according to the SA.

2. The method according to claim 1 further comprising: before the sending, by an MTC server, a BSF a request message, registering the MTC device on the MTC server, and storing, by the MTC server, related information of the MTC device.

3. The method according to claim 1, wherein the parametric information of the triggering instruction further comprises a Trigger Time during which the MTC device sends information after being triggered.

4. The method according to claim 1, further comprising: after sending, by the BSF, the GPI that comprises the parametric information of the triggering instruction to the MTC server,
storing, by the MTC server, subscriber-related information of the MTC device to be triggered and the GPI except the parametric information of the triggering instruction into a SA.

5. The method according to claim 4, further comprising: before the sending, by an MTC server, a BSF a request message,
registering the MTC device on the MTC server, and storing, by the MTC server, related information of the MTC device.

6. A system for triggering a Machine Type Communication (MTC) device, comprising:
a Machine Type Communication (MTC) server, a Bootstrapping Server Function (BSF) entity and an MTC device,
wherein the MTC server is configured to send the BSF a request message comprising information on a Generic Bootstrapping Architecture Push (GBA-PUSH) Information (GPI) request and information on a triggering request of triggering an MTC device, when the MTC device is not connected to the MTC server;
wherein the BSF is configured to generate GPI through a GPI request processing flow, wherein the GPI comprises the following: a version of the GPI, random number (RAND) in Universal Mobile Telecommunications System (UMTS) Authentication and Key Agreement (AKA), Authentication token (AUTN) or AUTN(*), an identifier for Universal Integrated Circuit Card (UICC) application to use, an indicator for use of Mobile Equipment (ME)-based GBA (GBA_ME) or GBA with UICC-based enhancements (GBA_U), a concatenation of Network Application Function (NAF) Fully Qualified Domain Name (FQDN) and a reference point Ua security protocol Identifier (Id), a requested NAF-Key life time, a NAF Security Association (SA) identifier, and a message authentication code over the GPI;
and add parametric information of a triggering instruction of triggering the MTC device in the GPI according to the information on the triggering request, and send the GPI comprising the parametric information of the triggering instruction to the MTC server; wherein the parametric information of the triggering instruction comprises a Trigger Indication;
wherein the MTC server is configured to send the GPI comprising the parametric information of the triggering instruction to the MTC device to be triggered;
wherein the MTC device is configured to, after receiving the GPI, store the GPI and subscriber-related information of the MTC device into a SA;
wherein the MTC device is further configured to be triggered according to the Trigger Indication in the received GPI; and
wherein the MTC device is further configured to, after being triggered, return a triggering response to the MTC server and establish a secure connection with the MTC server according to the SA.

7. The system according to claim 6, wherein the MTC server is configured to, before sending the BSF the request message, accept registration of the MTC device and store related information of the MTC device.

8. The system according to claim 6, wherein the parametric information of the triggering instruction further comprises a Trigger Time during which the MTC device sends information after being triggered.

9. The system according to claim 6, wherein the MTC server is configured to, after receiving the GPI, store subscriber-related information of the MTC device to be triggered and the GPI except the parametric information of the triggering instruction into a SA.

* * * * *